(12) United States Patent
Igarashi et al.

(10) Patent No.: US 12,276,976 B2
(45) Date of Patent: Apr. 15, 2025

(54) WORK MACHINE MAINTENANCE MANAGEMENT SYSTEM

(71) Applicant: Hitachi Construction Machinery Co., Ltd., Tokyo (JP)

(72) Inventors: Takashi Igarashi, Tochigi (JP); Yasuhiko Abe, Ibaraki (JP); Yukihito Suzuki, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 459 days.

(21) Appl. No.: 17/909,031

(22) PCT Filed: Oct. 13, 2021

(86) PCT No.: PCT/JP2021/037846
§ 371 (c)(1),
(2) Date: Sep. 2, 2022

(87) PCT Pub. No.: WO2022/080400
PCT Pub. Date: Apr. 21, 2022

(65) Prior Publication Data
US 2023/0092796 A1      Mar. 23, 2023

(30) Foreign Application Priority Data
Oct. 13, 2020   (JP) ................. 2020-172283

(51) Int. Cl.
*G05B 23/02*     (2006.01)
(52) U.S. Cl.
CPC ...... *G05B 23/0283* (2013.01); *G05B 2223/02* (2018.08)
(58) Field of Classification Search
CPC ............ G05B 23/0283; G05B 23/0243; G05B 2223/02; G05B 19/418; Y02P 90/02; G06Q 10/20; G06Q 10/06
See application file for complete search history.

(56) References Cited

U.S. PATENT DOCUMENTS

| | | | |
|---|---|---|---|
| 2002/0013635 A1 | 1/2002 | Gotou et al. | |
| 2002/0046048 A1* | 4/2002 | Fukushima | G05B 23/0283 |
| | | | 709/223 |

(Continued)

FOREIGN PATENT DOCUMENTS

| | | |
|---|---|---|
| GB | 2585286 A | 1/2021 |
| JP | 2001-356808 A | 12/2001 |

(Continued)

OTHER PUBLICATIONS

International Search Report (PCT/ISA/210) issued in PCT Application No. PCT/JP2021/037846 dated Jan. 18, 2022 with English translation (four (4) pages).

(Continued)

*Primary Examiner* — Mong-Shune Chung
(74) *Attorney, Agent, or Firm* — Crowell & Moring LLP

(57) ABSTRACT

Provided is a work machine maintenance management system capable of predicting replacement timing of a component of a work machine early. The work machine maintenance management system of this disclosure includes a maintenance management DB server 110 that accumulates maintenance management information of a plurality of work machines and a maintenance management control device 120 that predicts replacement timing of each component of each of the work machines based on the maintenance management information. The maintenance management information includes an actual durable period from start of use to replacement each component of each work machine. The maintenance management control device 120 includes a replacement-factor determining section 121, a service life model creator 122, a failure model creator 123, and a replacement time predictor 126. The replacement-factor determining section 121 determines whether a replacement factor of each component is a service life factor or a failure factor based on an actual durable period of each component (Continued)

of the plurality of work machines. The service life model creator 122 creates a service life model of the component whose replacement factor is determined to be the service life factor by the replacement-factor determining section 121. The failure model creator 123 creates a failure model of the component whose replacement factor is determined to be the failure factor by the replacement-factor determining section 121. The replacement time predictor 126 predicts the replacement timing of each component of each work machine based on the service life model and the failure model.

7 Claims, 12 Drawing Sheets

(56) References Cited

U.S. PATENT DOCUMENTS

| | | | | |
|---|---|---|---|---|
| 2005/0021245 | A1* | 1/2005 | Furuno | E02F 9/2292 |
| | | | | 702/33 |
| 2009/0259507 | A1* | 10/2009 | Miwa | G06Q 10/06314 |
| | | | | 705/305 |
| 2015/0220875 | A1* | 8/2015 | Tamaki | G06Q 10/20 |
| | | | | 705/7.23 |

FOREIGN PATENT DOCUMENTS

| | | | |
|---|---|---|---|
| JP | 2009-068259 | A | 4/2009 |
| JP | 4416306 | B2 * | 2/2010 |
| JP | 2014-174684 | A | 9/2014 |
| JP | 5718457 | B2 | 5/2015 |
| JP | 2017-102527 | A | 6/2017 |
| JP | 2017-174308 | A | 9/2017 |
| JP | 6764546 | B1 | 9/2020 |
| JP | 7018788 | B2 * | 2/2022 |
| KR | 10-2020-0052461 | A | 5/2020 |
| KR | 10-2020-0109362 | A | 9/2020 |

OTHER PUBLICATIONS

Japanese-language Written Opinion (PCT/ISA/237) issued in PCT Application No. PCT/JP2021/037846 dated Jan. 18, 2022 (three (3) pages).

Extended European Search Report issued in European Application No. 21880138.9 dated Oct. 15, 2024 (9 pages).

Korean-language Office Action issued in Korean Application No. 10-2022-7029258 dated Aug. 13, 2024 (6 pages).

* cited by examiner

Fig. 9

| Model | Unit | Distributor | Part Name | Part Number | Fiscal Year 2021 | | | | | | | | | | | |
|---|---|---|---|---|---|---|---|---|---|---|---|---|---|---|---|---|
| | | | | | Apr | May | Jun | Jul | Aug | Sep | Oct | Nov | Dec | Jan | Feb | Mar |
| A | 001 | a | Part 1 | 123456 | 10 | 5 | 1 | 1 | 7 | 2 | 2 | 0 | 0 | 6 | 1 | 0 |
| A | 002 | a | Part 1 | 123456 | 2 | 0 | 3 | 1 | 2 | 0 | 4 | 1 | 0 | 2 | 0 | 1 |
| A | 003 | b | Part 1 | 123456 | 4 | 5 | 1 | 1 | 3 | 3 | 1 | 0 | 0 | 0 | 0 | 0 |
| A | 004 | b | Part 1 | 123456 | 0 | 0 | 4 | 2 | 2 | 0 | 0 | 1 | 0 | 0 | 0 | 0 |
| Total | | | | | 16 | 10 | 9 | 5 | 14 | 5 | 7 | 2 | 0 | 8 | 1 | 1 |

| Distributor | Part Name | Part Number | Fiscal Year 2021 | | | | | | | | | | | | |
|---|---|---|---|---|---|---|---|---|---|---|---|---|---|---|---|
| | | | Apr | May | Jun | Jul | Aug | Sep | Oct | Nov | Dec | Jan | Feb | Mar |
| a | Part 1 | 123456 | 12 | 5 | 4 | 2 | 9 | 2 | 6 | 1 | 0 | 8 | 1 | 1 |
| b | Part 1 | 123456 | 4 | 5 | 5 | 3 | 5 | 3 | 1 | 1 | 0 | 0 | 0 | 0 |

Fig 11

- Shipment Time Limit and Number of Shipments from Regional Base to Distributor

| Model | Distributor | Part Name | Part Number | Fiscal Year 2020 ||||||||||||| Fiscal Year 2021 |||||||||||||
|---|---|---|---|---|---|---|---|---|---|---|---|---|---|---|---|---|---|---|---|---|---|---|---|---|---|---|
| | | | | Apr | May | Jun | Jul | Aug | Sep | Oct | Nov | Dec | Jan | Feb | Mar | Apr | May | Jun | Jul | Aug | Sep | Oct | Nov | Dec | Jan | Feb | Mar |
| A | a | Part 1 | 123456 | -- | -- | -- | -- | -- | -- | -- | -- | -- | -- | -- | 12 | 5 | 4 | 2 | 9 | 2 | 6 | 1 | 0 | 8 | 1 | 1 | -- |
| A | b | Part 1 | 123456 | | | | | | | | | | | | | | | | | | | | | | | | |

One Month

- Shipment Time Limit and Number of Shipments from Manufacturer to Each Regional Base and Distributor

| Model | Distributor | Part Name | Part Number | Fiscal Year 2020 ||||||||||||| Fiscal Year 2021 |||||||||||||
|---|---|---|---|---|---|---|---|---|---|---|---|---|---|---|---|---|---|---|---|---|---|---|---|---|---|---|
| | | | | Apr | May | Jun | Jul | Aug | Sep | Oct | Nov | Dec | Jan | Feb | Mar | Apr | May | Jun | Jul | Aug | Sep | Oct | Nov | Dec | Jan | Feb | Mar |
| A | a | Part 1 | 123456 | -- | -- | -- | -- | -- | -- | -- | -- | 12 | 5 | 4 | 2 | 9 | 2 | 6 | 1 | 0 | 8 | 1 | 1 | 0 | -- | 1 | -- |
| A | b | Part 1 | 123456 | -- | -- | -- | -- | -- | -- | -- | -- | -- | -- | 4 | 5 | 5 | 3 | 5 | 3 | 1 | 1 | 0 | 0 | 0 | -- | -- | -- |

Two Months / Three Months

- Shipment Time limit and Number of Shipments from Manufacturer to Regional Base and Distributor

| Part Name | Part Number | Fiscal Year 2020 ||||||||||||| Fiscal Year 2021 |||||||
|---|---|---|---|---|---|---|---|---|---|---|---|---|---|---|---|---|---|---|---|---|
| | | Apr | May | Jun | Jul | Aug | Sep | Oct | Nov | Dec | Jan | Feb | Mar | Apr | May | Jun | Jul | Aug | Sep | Oct | Nov | Dec | Jan | Feb | Mar |
| Part 1 | 123456 | -- | -- | -- | -- | -- | 12 | 5 | 8 | 7 | 14 | 5 | 11 | 1 | 9 | 1 | 1 | 1 | 9 | 1 | 1 | 0 | 0 | -- | -- |

- Order Time Limit and Number of Orders from Manufacturer to Component Supplier

| Part Name | Part Number | Fiscal Year 2020 ||||||||||||| Fiscal Year 2021 |||||||
|---|---|---|---|---|---|---|---|---|---|---|---|---|---|---|---|---|---|---|---|---|
| | | Apr | May | Jun | Jul | Aug | Sep | Oct | Nov | Dec | Jan | Feb | Mar | Apr | May | Jun | Jul | Aug | Sep | Oct | Nov | Dec | Jan | Feb | Mar |
| Part 1 | 123456 | -- | -- | -- | -- | 12 | 5 | 8 | 7 | 14 | 5 | 11 | 4 | 1 | 9 | 1 | 1 | 0 | 0 | -- | -- | -- | -- | -- | -- |

Four Months

| Month | Fiscal Year 2020 | | | | | | | | | | | | Fiscal Year 2021 | | | | | | |
|---|---|---|---|---|---|---|---|---|---|---|---|---|---|---|---|---|---|---|---|
| | Apr | May | Jun | Jul | Aug | Sep | Oct | Nov | Dec | Jan | Feb | Mar | Apr | May | Jun | Jul | Aug | Sep | Oct |
| Necessary Number of Orders | 0 | 0 | 0 | 0 | 12 | 5 | 8 | 7 | 14 | 5 | 11 | 4 | 1 | 9 | 1 | 1 | 0 | 0 | — |
| Necessary Number of Orders (Accumulated Value) | 0 | 0 | 0 | 0 | 12 | 17 | 25 | 32 | 46 | 51 | 62 | 66 | 67 | 76 | 77 | 78 | 78 | 78 | — |
| Leveled Number of Orders | 5 | 5 | 5 | 6 | 6 | 6 | 6 | 6 | 6 | 6 | 6 | 6 | 6 | 6 | 0 | 0 | 0 | 0 | — |
| Leveled Number of Orders (Accumulated Value) | 5 | 10 | 15 | 21 | 27 | 33 | 39 | 45 | 51 | 57 | 63 | 69 | 75 | 81 | 81 | 81 | 81 | 81 | — |

WORK MACHINE MAINTENANCE MANAGEMENT SYSTEM

TECHNICAL FIELD

The present disclosure relates to a work machine maintenance management system.

BACKGROUND ART

Conventionally, a monitor and diagnosis system for machine component that includes a rolling element has been known (see Patent Literature 1 below). The monitor and diagnosis system for machine component described in Patent Literature 1 includes a sensor, sensor information transmitting means, sensor information receiving means, diagnosis means, diagnostic result information transmitting means, and diagnostic result information receiving means (see Claim 1, Paragraph 0005, and FIG. 3).

The above-described sensor detects a service life related factor of a machine component incorporated in a machine in a plant of a customer's company. The above-described sensor information transmitting means transmits sensor information that is information detected by the above-described sensor or the processed information thereof to a line. The above-described sensor information receiving means receives the sensor information transmitted via the above-described line provided in the plant of the company that produces and sells the above-described machine component.

The above-described diagnosis means diagnoses a service life status of the above-described machine component based on the sensor information received by the above-described sensor information receiving means. The above-described sensor information receiving means transmits diagnostic result information to the line of the above-described diagnosis means. The above-described sensor information receiving means receives the diagnostic result information transmitted to the above-described line provided in the plant of the above-described customer company.

CITATION LIST

Patent Literature

Patent Literature 1: JP 2001-356808 A

SUMMARY OF INVENTION

Technical Problem

The number of productions of work machine is small compared with the number of productions of ordinary general-purpose machine, and the work machines often include order production components. Thus, their lead times from order to delivery tend to be longer than the lead time of the ordinary general-purpose machines. This tendency is remarkable in the extremely large-sized work machines, which are operated in mines or the like. Therefore, even if the replacement time can be predicted, the component might not be able to be delivered by the replacement timing. This possibly results in the stop of the operation of the work machine. Accordingly, it is desired that the replacement timings of components of the work machines are predicted early.

The present disclosure is to provide a work machine maintenance management system that is able to predict the replacement timings of components of the work machines early.

Solution to Problem

One aspect of the disclosure is a work machine maintenance management system. The work machine maintenance management system includes a maintenance management database server and a maintenance management control device. The maintenance management database server accumulates maintenance management information of a plurality of work machines. The maintenance management control device predicts a replacement timing of each component of each of the plurality of work machines based on the maintenance management information. The maintenance management information includes an actual durable period from start of use to replacement of each of the components of each of the plurality of work machines. The maintenance management control device includes a replacement-factor determining section, a service life model creator, a failure model creator, and a replacement time predictor. The replacement-factor determining section determines whether a replacement factor of each of the components is a service life factor or a failure factor based on the actual durable period of each of the components of a plurality of the work machines. The service life model creator creates a service life model of the component whose replacement factor is determined to be the service life factor by the replacement-factor determining section. The failure model creator creates a failure model of the component whose replacement factor is determined to be the failure factor by the replacement-factor determining section. The replacement time predictor predicts a replacement timing of each of the components of each of the plurality of work machines based on the service life model and the failure model.

Advantageous Effects of Invention

The above-described one aspect of the present disclosure can provide a work machine maintenance management system that is able to predict the replacement timings of components of the work machines early.

BRIEF DESCRIPTION OF DRAWINGS

FIG. 9 is a table illustrating an exemplary totalization result of the number-of-replacement counter of the maintenance management control device in FIG. 2.

FIG. 11 is a table for describing the process by the order timing predictor in FIG. 10.

DESCRIPTION OF EMBODIMENTS

The following will describe an embodiment of a work machine maintenance management system according to this disclosure with reference to the drawings.

Figure 1:
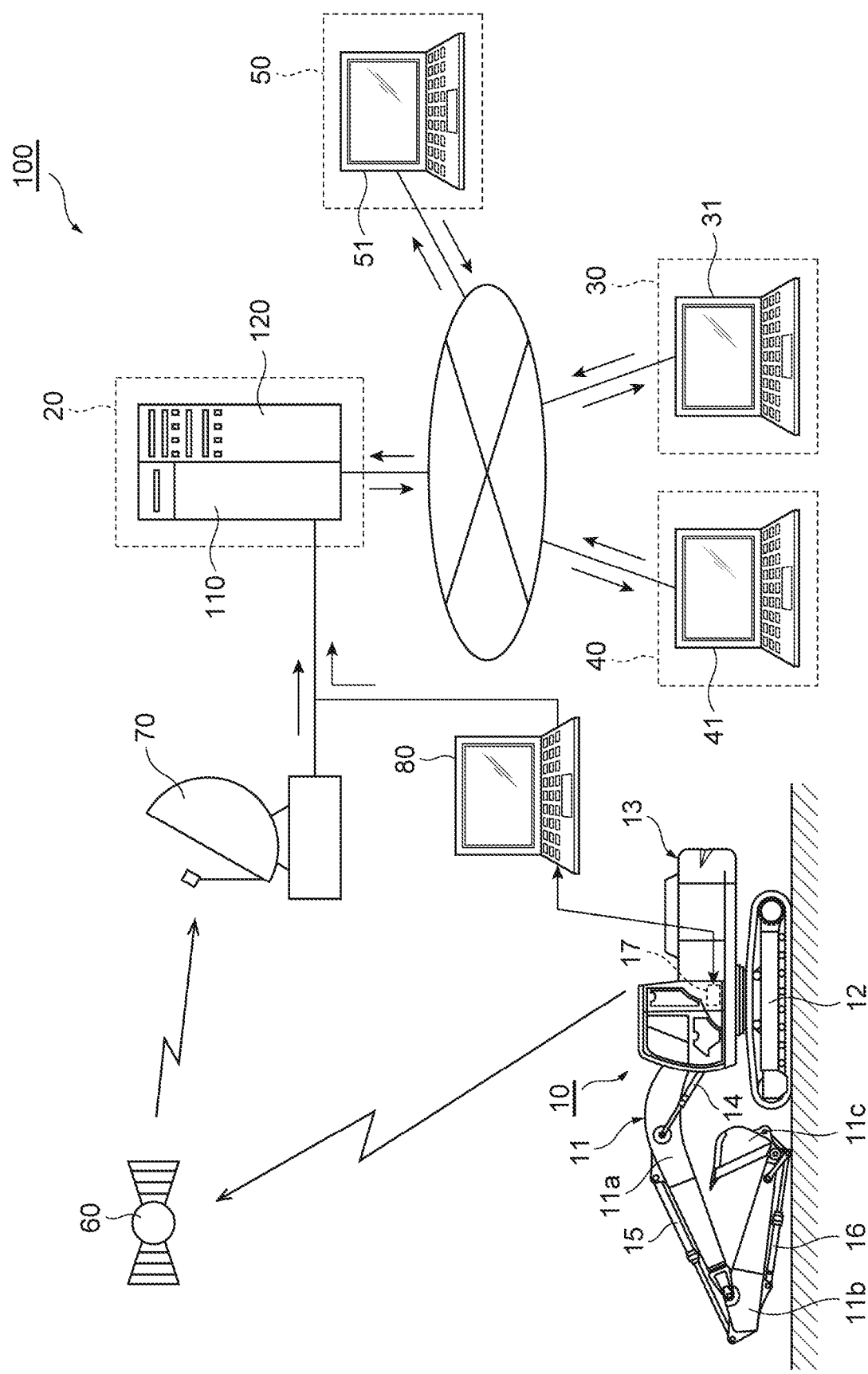
FIG. 1 is a schematic diagram illustrating an embodiment of a work machine maintenance management system according to the present disclosure.

FIG. 1 is a schematic diagram illustrating an overall configuration of an embodiment of a work machine maintenance management system according to the present disclosure. A maintenance management system 100 of the embodiment is a system for performing a maintenance management of a work machine 10, such as a hydraulic shovel. The work machine 10 as a target of the maintenance management by the maintenance management system 100 is not limited to the hydraulic shovel, and the work machine 10 may be, for example, a wheel loader, a road machine, a dump truck, a double-armed machine, or the like.

The maintenance management system 100 mainly includes a maintenance management database server 110 (hereinafter referred to as a maintenance management DB server 110), which accumulates maintenance management information of a plurality of the work machine 10, and a maintenance management control device 120, which predicts replacement timings for each component of each of the work machines 10, based on the maintenance management information. FIG. 1 indicates only one work machine 10 among the plurality of work machines 10. The maintenance management DB server 110 and the maintenance management control device 120 are installed in, for example, a maintenance management center 20. The installation sites of the maintenance management DB server 110 and the maintenance management control device 120 are not particularly limited and may be, for example, a manufacturer 30, a distributor 40, or a component supplier 50 of the work machine 10.

The work machine 10 includes a plurality of components that necessitate replacement. In an example shown in FIG. 1, the work machine 10 is a hydraulic shovel and includes an articulated type front working machine 11, a running body 12, which is driven by a hydraulic motor, and an upper rotary body 13, which turns above the running body 12. The front working machine 11 includes a boom 11a, which is coupled to the upper rotary body 13 and driven by a boom cylinder 14, an arm 11b, which is coupled to the boom 11a and driven by an arm cylinder 15, and a bucket 11c, which is coupled to the arm 11b and driven by a bucket cylinder 16.

The work machine 10 includes, for example, a controller 17 and a communication device, which is not illustrated. The controller 17 is constituted of, for example, a microcontroller including an input/output unit, a central processing unit (CPU), a memory, a timer, or the like. The controller 17 controls respective units of the work machine 10 and obtains various kinds of information related to the work machine 10. The communication device is connected to the maintenance management DB server 110 via, for example, the wireless communication line and the wired communication line. The wireless communication line may be, for example, a satellite communication line via a communication satellite 60 and a ground station 70 or an ordinary wireless communication line via a wireless base station on the ground.

The controller 17 obtains operating information of the work machine 10 from, for example, sensors provided on respective portions of the work machine 10. The controller 17 transmits the operating information of the work machine 10 along with attribute information of the work machine 10 to the maintenance management DB server 110 via, for example, a communication device, the wireless communication line, and the wired communication line. Here, the operating information of the work machine 10 obtained by the controller 17 includes a cumulative used time of the work machine 10 measured by, for example, an hour meter. The operating information of the work machine 10 includes, for example, at least one of a cumulative running time, a cumulative turning time, a cumulative excavation time, a fuel consumption, an air intake volume, an engine oil amount, a cooling water amount, a discharge flow rate and a discharge pressure of a hydraulic pump, a temperature of a hydraulic oil, or a pressure of the hydraulic oil in a hydraulic cylinder. The attribute information of the work machine 10 includes, for example, at least one of a model, a type, an identification number, user information, or location information.

The controller 17 is connected to, for example, a maintenance terminal 80 via the wireless communication line or the wired communication line and transmits the operating information of the work machine 10 to the maintenance terminal 80. The maintenance terminal 80 includes, for example, a mobile terminal, such as a smart phone, a tablet PC, a notebook PC, or the like and transmits the operating information obtained from the work machine 10 to the maintenance management DB server 110 via the wireless communication line or the wired communication line. The maintenance terminal 80 is used by a maintenance personnel in, for example, the distributor 40 and/or a service maintenance plant for the work machine 10. When the information communication between the controller 17 of the work machine 10 and the maintenance management DB server 110 via the wireless communication line is difficult, it is possible to transmit the operating information of the work machine 10 to the maintenance management DB server 110 via the maintenance terminal 80.

The maintenance management DB server 110 is communicatively connected to, for example, a plurality of terminals 31, 41, 51 via a communication line, such as Internet. These plurality of terminals 31, 41, 51 may include, for example, the terminal 31 of the manufacturer 30 of the work machine 10, the terminal 41 of the distributor 40 of the work machine 10, the terminal 51 of a user or the component supplier 50 of the work machine 10, or the like and may be communicatively connected to one another. The maintenance management system 100 may include, for example, computer programs to be loaded on the controller 17 of the work machine 10, the maintenance terminal 80, and the plurality of terminals 31, 41, 51.

Figure 2:
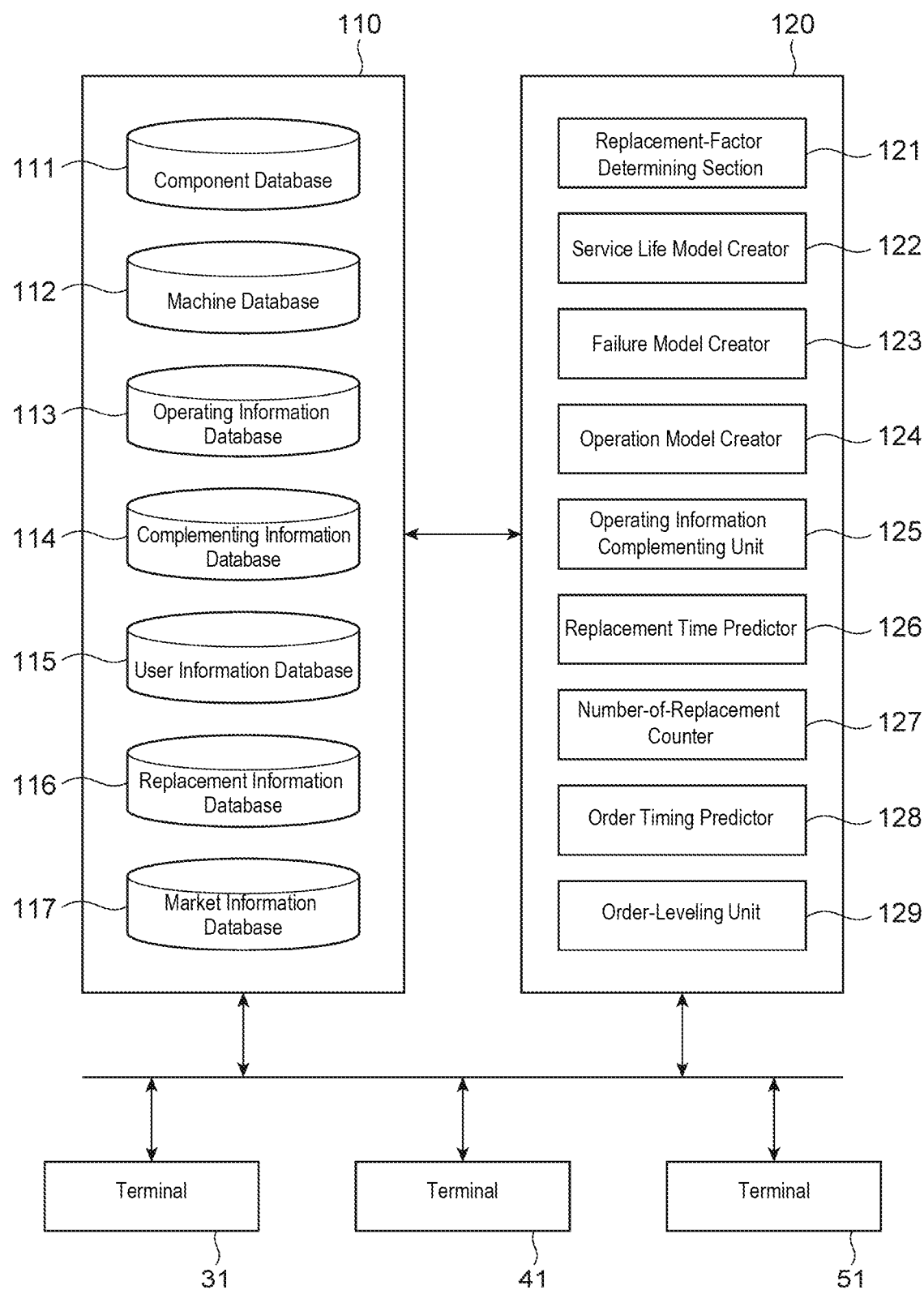
FIG. 2 is a function block diagram of a maintenance management database server and a maintenance management control device of the maintenance management system in FIG. 1.

FIG. 2 is a function block diagram of the maintenance management DB server 110 and the maintenance management control device 120 shown in FIG. 1. The maintenance management DB server 110 and the maintenance management control device 120 are computers each including, for example, an input/output unit, a processing unit, such as a CPU, a storage device, such as a memory and a hard disk drive, data and computer programs stored in the storage device, and the like. The maintenance management DB server 110 and the maintenance management control device 120 are communicatively connected to one another and are also communicatively connected to the plurality of terminals 31, 41, 51 and/or the maintenance terminal 80 via the communication line.

The maintenance management DB server 110 accumulates the maintenance management information of the plurality of work machines 10. The maintenance management information includes, for example, an actual durable period from start of use to replacement for each component of each of the work machines 10. The maintenance management information includes, for example, a lead time from order to delivery for each component of the work machine 10. The maintenance management information includes, for example, an inventory quantity of each component of the work machine 10 and a suppliable number of each component in its manufacturing period of the work machine 10. The maintenance management information includes, for example, the operating information of each of the work machines 10. The maintenance management information includes, for example, the attribute information of each of the work machines 10. The maintenance management information include market information related to each of the work machines 10. The maintenance management information is recorded in, for example, the maintenance management DB server 110 as a database.

In an example shown in FIG. 2, the maintenance management DB server 110 includes, for example, a component database 111, a machine database 112, an operating information database 113, and a complementing information database 114. The maintenance management DB server 110 includes, for example, a user information database 115, a replacement information database 116, and a market information database 117.

Among the above-described maintenance management information, the component database 111 stores, for example, the lead time of each component of the work machine 10, the inventory quantity of each component of the work machine 10, and the suppliable number of each component in its manufacturing period of the work machine 10. Here, the lead time is, for example, a necessary period from order to delivery of each component of the work machine 10 set for each region. The suppliable number in the manufacturing period of each component represents a supply capacity of component of the component supplier 50 in the manufacturing period. The component database 111 stores, for example, computation results of the number-of-replacement counter 127, the order timing predictor 128, and the order-leveling unit 129 of the maintenance management control device 120 described later.

Among the above-described maintenance management information, the machine database 112 stores, for example, the attribute information of the plurality of work machines 10. Here, the attribute information of the work machine 10 stored in the machine database 112 includes, for example, the identification number, the model, the type, the location information, and the delivery date for the user of the work machine 10.

Among the above-described maintenance management information, the operating information database 113 stores, for example, the operating information of each of the work machines 10. As described above, the operating information includes, for example, the cumulative used time, the cumulative running time, the cumulative turning time, the cumulative excavation time, the fuel consumption, the air intake volume, the engine oil amount, and the cooling water amount of each of the work machines 10. The operating information of the work machine 10 includes, for example, the discharge flow rate and the discharge pressure of the hydraulic pump, the temperature of the hydraulic oil, the pressure of the hydraulic oil in the hydraulic cylinder.

Each piece of the operating information of the work machine 10 is transmitted from the controller 17 or the maintenance terminal 80 of each of the work machines 10, together with the attribute information of each of the work machines 10, to the maintenance management DB server 110 periodically, such as every hour, every half day, or every day. The maintenance management DB server 110 stores and accumulates the received operating information of each of the work machines 10 in the operating information database 113.

The complementing information database 114 stores, for example, complementary operating information, which includes computation results of an operating information complementing unit of the maintenance management control device 120 described later. When, for example, the operating information has a missing portion due to a malfunction of a sensor or the like in one work machine 10, the complementary operating information is used to complement the missing portion of the operating information.

Among the attribute information of the work machine 10 as the above-described maintenance management information, the user information database 115 stores, for example, an identification information, a category of business, a location, an object to be excavated, a distributor 40 in charge of a user of each of the work machines 10.

Among the above-described maintenance management information, the replacement information database 116 stores, for example, the actual durable period from start of use to replacement of each component of each of the work machines 10. More specifically, for example, a replacement date of each component of each of the work machines 10 is transmitted from the controller 17 or the maintenance terminal 80 of each of the work machines 10 to the maintenance management DB server 110. The maintenance management DB server 110 stores the received replacement date of each component of each of the work machines 10 in the replacement information database 116. The replacement information database 116 calculates and holds, for example, a time period between the replacement dates of each component of each of the work machines 10, that is, the time period from the previous replacement date to the next replacement date as the actual durable period of each component. The replacement information database 116 stores, for example, a flag information of each component of each of the work machines 10 input by the maintenance personnel via the maintenance terminal 80. The flag information represents a replacement cause of a component, such as a replacement due to service life, a replacement due to failure, or the like.

Among the above-described maintenance management information, the market information database 117 stores, for example, the market information related to each of the work machines 10. The market information includes at least one of, for example, price and supply and demand of the object to be excavated, such as iron ore and coal, of the work machine 10, fuel price of the work machine 10, or indexes of business conditions.

The maintenance management control device 120 includes, for example, a replacement-factor determining section 121, a service life model creator 122, a failure model creator 123, and a replacement time predictor 126. The maintenance management control device 120 may further include an operation model creator 124 and an operating information complementing unit 125. The maintenance management control device 120 may further include a number-of-replacement counter 127 and an order timing predictor 128. The maintenance management control device 120 may further include an order-leveling unit 129. These respective units of the maintenance management control device 120 represent functions of the maintenance management control device 120 achieved by, for example, execution of programs stored in a storage device by a processing device.

Figure 3:
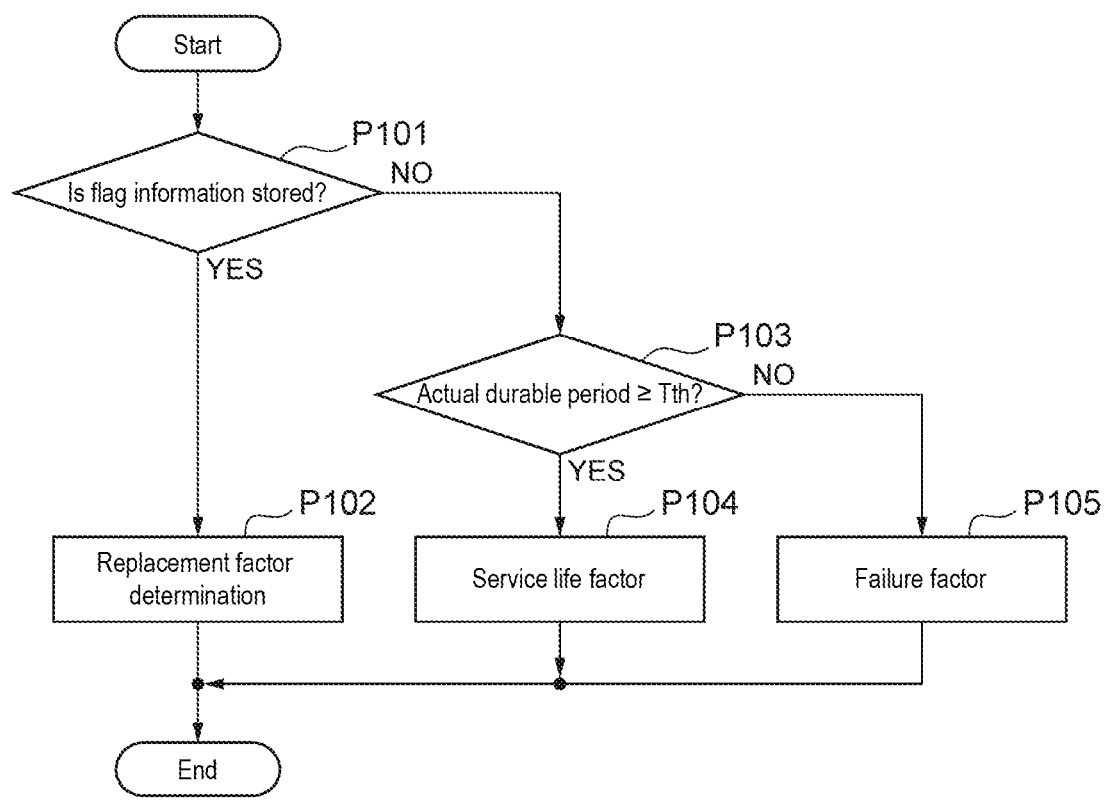
FIG. 3 is a flowchart illustrating a process flow of a replacement-factor determining section of the maintenance management control device in FIG. 2.

A description will be given of operations of the maintenance management system 100 of the embodiment with reference to FIG. 3 to FIG. 20 below. FIG. 3 is a flowchart illustrating a process flow of the replacement-factor determining section 121 of the maintenance management control device 120 in FIG. 2. The replacement-factor determining section 121 determines whether a replacement factor of each component is a service life factor or a failure factor based on the actual durable period of each component of the plurality of work machines 10. More specifically, the replacement-factor determining section 121, first, executes a process P101 that determines whether the replacement information database 116 stores the flag information indicating a failure factor of each component of each of the work machines 10 or not. The failure factor means an unexpected failure that occurs before the actual durable period ends.

In this process P101, when the replacement-factor determining section 121 has determined that the replacement information database 116 stores the flag information (YES), the replacement-factor determining section 121 executes a process P102 that determines whether the failure factor is the replacement due to service life or the replacement due to failure based on the flag information, and then terminates the process shown in FIG. 3. Meanwhile, in this process P101, when the replacement-factor determining section 121 has determined that the replacement information database 116 does not store the flag information (NO), the replacement-factor determining section 121 executes a process P103 that determines whether the actual durable period of the component is equal to or more than a predetermined threshold Tth or not. As described above, the flag information is information representing the replacement factor of the component, such as the replacement due to service life or the replacement due to failure, and stored in the replacement information database 116. However, in a case where any component replacement of the work machine 10 has not been done yet, for example, when it is immediately after shipping of the work machine 10, the flag information is not stored in the replacement information database 116.

In this process P103, when the replacement-factor determining section 121 has determined that the actual durable period of each component of each of the work machines 10 stored in the replacement information database 116 is equal to or more than the threshold Tth of the component (YES), the replacement-factor determining section 121 executes a process P104 that determines that the replacement factor is the service life factor, and then terminates the process shown in FIG. 3. In this process P104, the replacement-factor determining section 121 has determined that the replacement factor is the service life factor, and records the determined replacement factor in, for example, the replacement information database 116. Meanwhile, in the process P103, when the replacement-factor determining section 121 has determined that the actual durable period of each component is less than the threshold Tth of the component (NO), the replacement-factor determining section 121 executes a process P105 that determines that the replacement factor of the component is the failure factor, and then terminates the process shown in FIG. 3. In this process P105, the replacement-factor determining section 121 has determined that the replacement factor is the service life factor, and records the determined replacement factor in, for example, the replacement information database 116.

Thus, in the process P104 or the process P105, the replacement factor recorded in the replacement information database 116 is the flag information. The flag information recorded in the replacement information database 116 in the process P104 or the process P105 may be recoded to be distinguished from the flag information input by the maintenance personnel via the maintenance terminal 80 in the replacement information database 116. In this case, in the process P102 that determines the above-described failure factor, the flag information input by the maintenance personnel can be preferentially used.

Figure 4:
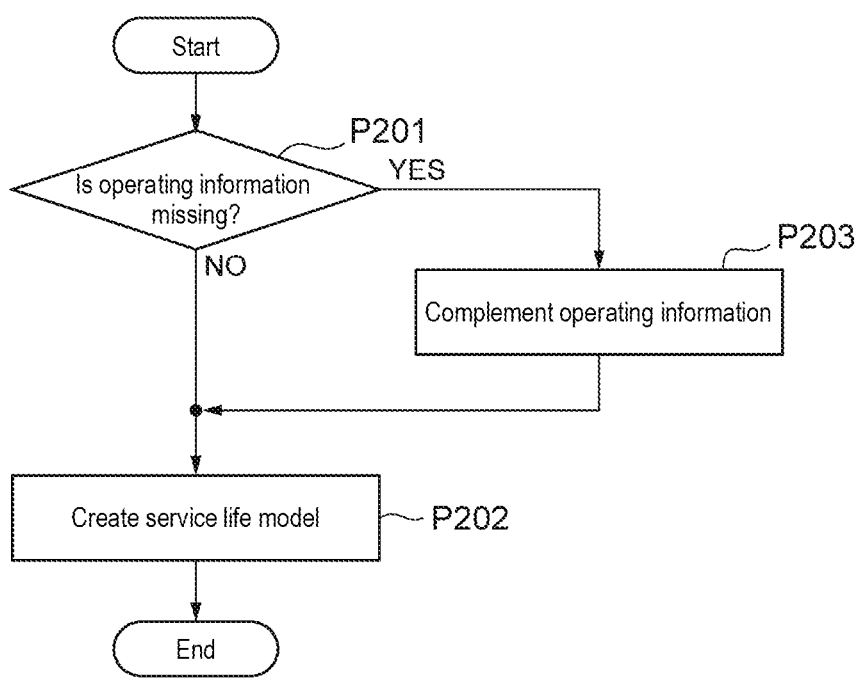
FIG. 4 is a flowchart illustrating a process flow of a service life model creator of the maintenance management control device in FIG. 2.

FIG. 4 is a flowchart illustrating a process flow of the service life model creator 122 of the maintenance management control device 120 in FIG. 2. The service life model creator 122 creates, for example, a service life model of each component based on the actual durable period of the component whose replacement factor is determined to be the service life factor by the replacement-factor determining section 121. More specifically, the service life model creator 122, first, executes the process P201 that determines a presence/absence of a missing piece of the operating information of the work machine 10 as a target.

In this process P201, when the service life model creator 122 has determined that the operating information of the work machine 10 as the target does not have a missing portion (NO), the service life model creator 122 executes the process P202 that creates an operation model. In this process P202, the service life model creator 122 creates, for example, a service life model using a multiple regression analysis, and terminates the process shown in FIG. 4. The multiple regression analysis takes the operating information of the work machine 10 including a component whose replacement factor is a service life factor as an explanatory variable and takes the actual durable period of the component whose replacement factor is the service life factor as an objective variable.

Meanwhile, in the process P201, when the service life model creator 122 has determined that the operating information of the work machine 10 as the target has a missing portion (YES), the service life model creator 122 executes a process P203 that complements the operating information of the work machine 10. Here, when the operating information of the work machine 10 has a missing portion, the operating information complementing unit 125 shown in FIG. 2 creates complementing information for complementing the missing portion of the operating information based on the operation model of the work machine 10. Similarly to the failure model creator 123 described later, the operating information complementing unit 125 may create a group of one or more work machines 10 based on the attribute information of the work machines 10, and create the complementing information based on an operation model of each group of the work machines 10.

In the above-described process P203, the service life model creator 122 complements the missing operating information using the complementing information created by the operating information complementing unit 125, subsequently executes the process P202 that creates the service life model, and then terminates the process shown in FIG. 4. The service life model is, for example, a model indicating how a component whose failure factor is a service life factor is exhausted by undergoing what kind of operation of the work machine 10 in an actual durable period of its component and having resulted in replacement.

In the above-described process P203, the service life model creator 122 may store the complemented operating information in the operating information database 113 of the maintenance management DB server 110, and may store the complemented operating information in the complementing information database 114 separately from the operating information stored in the operating information database 113. This allows the complemented operating information stored in the complementing information database 114 to be distinguished from the operating information without a missing portion stored in the operating information database 113.

When the number of pieces of the operating information of the work machines 10 stored in the replacement information database 116 is enough for execution of the multiple regression analysis, the service life model creator 122 may create a service life model using only the operating information without any missing portion, without using the operating information complemented in the process P202. The service life model creator 122 is allowed not to use the operating information of the work machine 10 whose missing rate exceeds a predetermined value for creation of a service life model.

Figure 5:
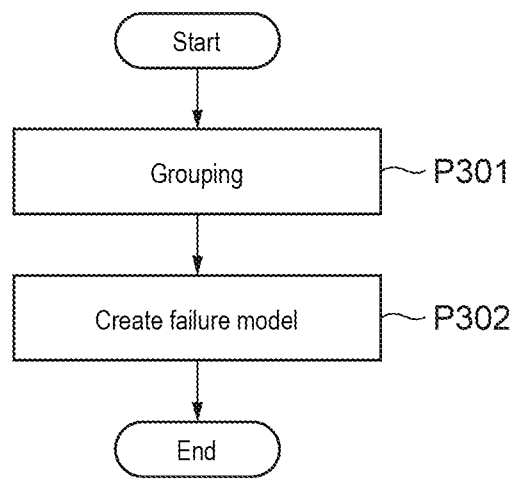
FIG. 5 is a flowchart illustrating a process flow of a failure model creator of the maintenance management control device in FIG. 2.

FIG. 5 is a flowchart illustrating a process flow of the failure model creator 123 of the maintenance management control device 120 in FIG. 2. The failure model creator 123 creates a failure model of each component based on an actual durable period of each component of each of the work machines 10 whose replacement factor is determined to be a failure factor by the replacement-factor determining section 121. Failure of each component of the work machine 10 is assumed to happen at a constant probability depending on, for example, usage and/or operation method of the work machine 10.

The failure model creator 123 creates, for example, one or more group of the work machines 10 including a component whose replacement factor is a failure factor based on the attribute information of the work machines 10, and creates a failure model of each group based on a plurality of pieces of the operating information of the work machines 10 included in each group.

More specifically, the failure model creator 123, first, executes a grouping process P301. In this grouping process P301, the failure model creator 123, first, refers to the machine database 112, the operating information database 113, and the user information database 115. Then, the failure model creator 123 obtains, for example, the attribute information of the work machine 10 that has employed a component whose replacement factor is a failure factor, the operating information of the work machine 10 in the actual durable period of the component, and user information of the work machine 10.

Furthermore, in the grouping process P301, the failure model creator 123 creates a group of one or more work machines 10 based on the obtained attribute information. More specifically, the failure model creator 123 groups the work machines 10 into one or more group based on, for example, the attribute information of the model, the type, and the location information of the work machine 10 whose replacement factor is a failure factor, and the identification information, the category of business, the location, and the object to be excavated of the user.

Next, the failure model creator 123 executes a process P302 that creates a failure model. In this process P302, the failure model creator 123 counts, for example, the number of components whose replacement factor is a failure factor in each group to calculate the total failure number for each of the components, and calculates the total operating time as a sum of the operating times of the work machines 10 in each group. Furthermore, the failure model creator 123 divides the total failure number by the total operating time to calculate an occurrence number of failures per unit time for each component in each group as a failure model, and terminate the process shown in FIG. 5. The failure model creator 123 may divide the total failure number by the total number of operating days as a sum of the numbers of operating days of the work machines 10 in each group to calculate an occurrence number of failures per day for each component in each group as a failure model.

Figure 6:
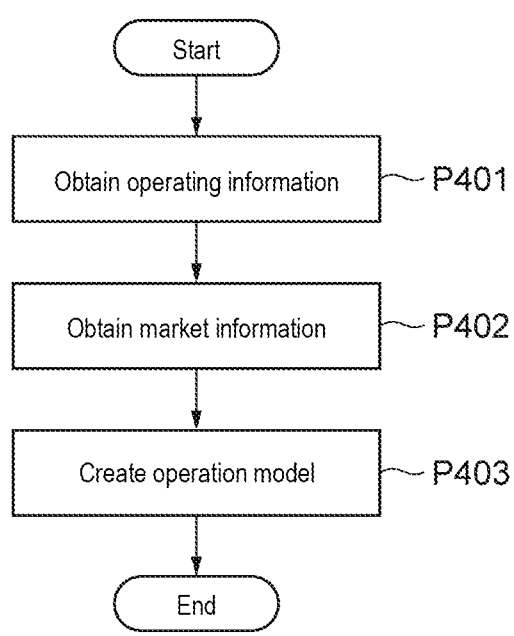
FIG. 6 is a flowchart illustrating a process flow of an operation model creator of the maintenance management control device in FIG. 2.

FIG. 6 is a flowchart illustrating a process flow of the operation model creator 124 of the maintenance management control device 120 in FIG. 2. The operation model creator 124 creates an operation model based on, for example, the operating information of each of the work machines 10 stored in the operating information database 113 of the maintenance management DB server 110 and the market information stored in the market information database 117 of the maintenance management DB server 110.

More specifically, the operation model creator 124, first, executes a process P401 that obtains the operating information of each of the work machines 10 stored in the operating information database 113 of the maintenance management DB server 110. Here, the operating information includes the cumulative used time as described above. Next, the operation model creator 124 executes a process P402 that obtains the market information in a period corresponding to the operating information of the work machine 10 from the market information database 117. Here, as described above, the market information includes at least one of price and supply and demand of the object to be excavated of the work machine 10, the fuel price of the work machine 10, or the indexes of business conditions.

Next, the operation model creator 124 executes the multiple regression analysis using a transition of the cumulative used times and the market information included in the obtained operating information to create an operation model of each of the work machines 10, and terminates the process shown in FIG. 6. The operation model creator 124 may create an operation model of the work machine 10 in each group created in the above-described grouping process P301 by the failure model creator 123. The operation model creator 124 may create an operation model by predicting a future operating time based on the past operating information without using the market information.

Figure 7:
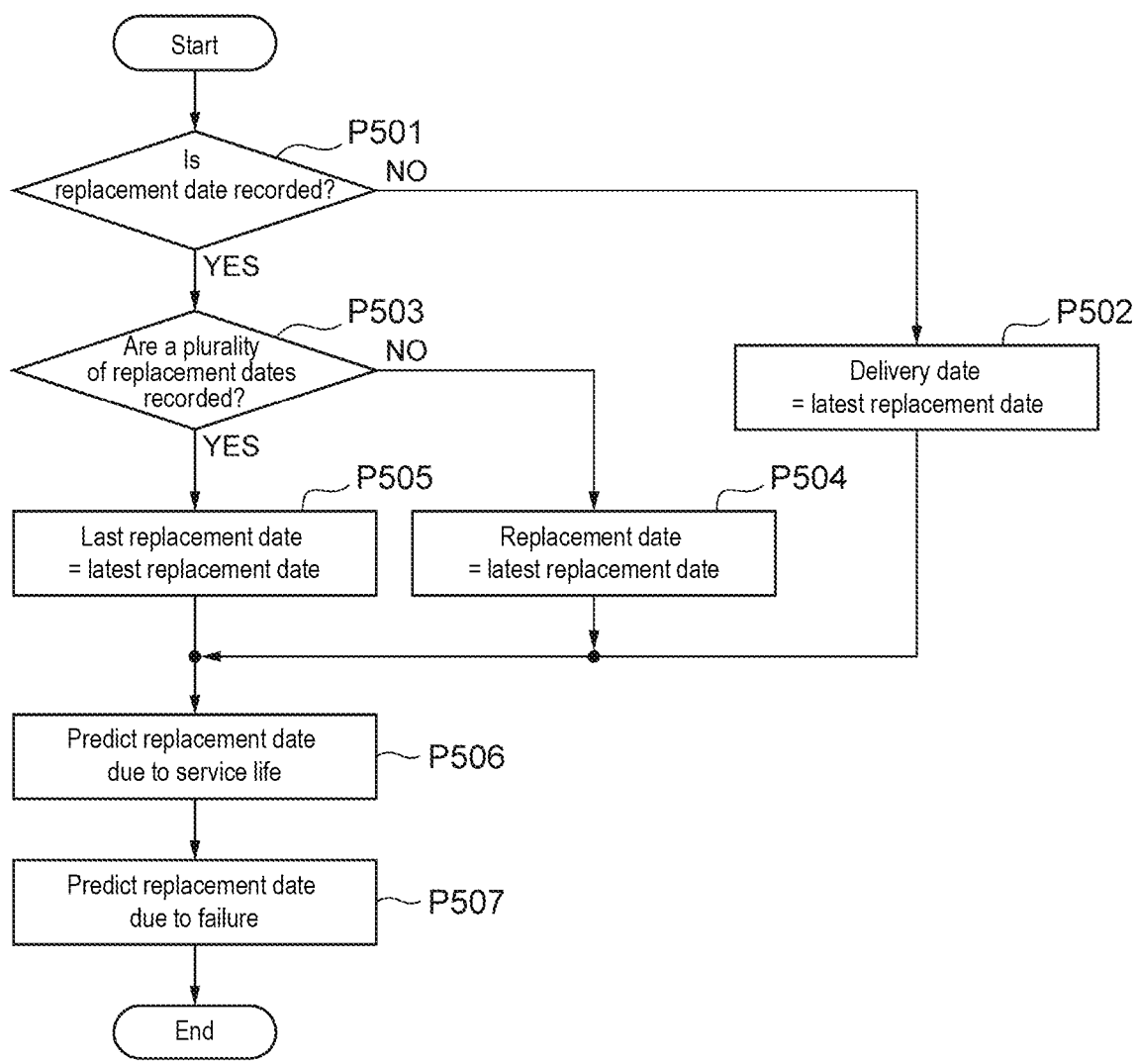
FIG. 7 is a flowchart illustrating a process flow of a replacement time predictor of the maintenance management control device in FIG. 2.

FIG. 7 is a flowchart illustrating a process flow of the replacement time predictor 126 of the maintenance management control device 120 in FIG. 2. The replacement time predictor 126 predicts a replacement timing of each component of each of the work machines 10 based on the above-described service life model and failure model. More specifically, the replacement time predictor 126 refers to, for example, the replacement information database 116 of the maintenance management DB server 110 and executes a process P501 that determine whether the replacement date is recorded or not for each component of each of the work machines 10. In this process P501, when the replacement time predictor 126 has determined that the replacement date is not recorded (NO), the replacement time predictor 126 executes, for example, a process P502 that refers to the machine database 112 and sets the delivery date of the work machine 10 to the user to the latest replacement date for the component of the work machine 10.

Meanwhile, in the above-described process P501, when the replacement time predictor 126 has determined that the replacement date is recorded (YES), the replacement time predictor 126 further refers to the replacement information database 116 and executes a process P503 that determines whether a plurality of the replacement dates are recorded or not for the component of the work machine 10. In this process P503, when the replacement time predictor 126 has determined that the recorded replacement date is one (NO), the replacement time predictor 126 executes a process P504 that sets the replacement date to the latest replacement date. When the replacement time predictor 126 has determined that a plurality of the replacement dates are recorded (YES), the replacement time predictor 126 executes a process P505 that sets the most recent replacement date to the latest replacement date.

The work machine 10 includes a plurality of the same components in some cases. In this case, the plurality of same components may be treated as one component. Even in the case of the plurality of same components, the component may be treated as an individual component when the same components do not have to be replaced simultaneously. Each of the work machines 10 may hold the replacement date of each component in, for example, the controller 17. The replacement time predictor 126 executes a process P506 that predicts a replacement date due to service life after the termination of the above-described process P502, P504, or P505.

In this process P506, the replacement time predictor 126 refers to, for example, the machine database 112, and refers to the operation model created by the operation model creator 124 for each group of the work machines 10 created by the above-described failure model creator 123. Then, an operating time transition based on the operation model is input to the service life model created by the service life model creator 122, and the replacement date due to service life for each component of each of the work machines 10 is calculated with each of the latest replacement date as the starting point.

Here, in the time period in which the actual operating time from the latest replacement date to the present can be obtained for each component of each of the work machines 10, this actual operating time may be used as an input for the service life model created by the service life model creator 122. The replacement time predictor 126 executes the above-described process P506 using the replacement date due to service life of the component currently in use as the latest replacement date to allow a longer-term demand prediction for the component by predicting a replacement date due to service life of a new component after the replacement of the currently used component.

Next, the replacement time predictor 126 executes a process P507 that predicts a replacement date due to failure. In this process P507, the replacement time predictor 126 refers to, for example, the machine database 112, and refers to the operation model created by the operation model creator 124 for each group of the work machines 10 created by the above-described failure model creator 123. Then, the operating time transition in future based on the operation model is input to the failure model created by the failure model creator 123, the replacement date due to failure for each component of each of the work machines 10 is calculated with each of the latest replacement date as the starting point.

Here, the replacement time predictor 126 may, for example, input the sum of the operating times in the future based on the operation model for each group to the failure model to calculate a replacement date due to failure with the latest replacement date for each component of each of the work machines 10 as the starting point. Since the failure model is a statistical probability model, a replacement date due to failure may be calculated using an application date of the failure model as the starting point. The replacement time predictor 126 executes the above-described process P507 using the replacement date due to failure of the component currently in use as the latest replacement date to allow a longer-term demand prediction for the component by predicting the replacement date due to failure of a new component after the replacement of the currently used component.

Figure 8:
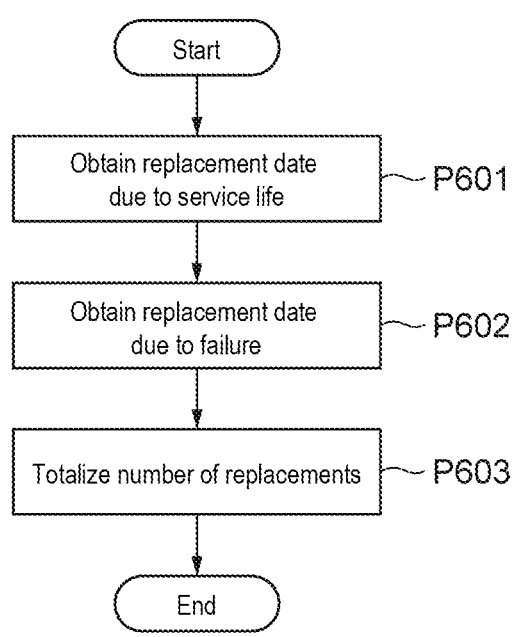
FIG. 8 is a flowchart illustrating a process flow of a number-of-replacement counter of the maintenance management control device in FIG. 2.

FIG. 8 is a flowchart illustrating a process flow of the number-of-replacement counter 127 of the maintenance management control device 120 in FIG. 2. The number-of-replacement counter 127 totalizes the number of replacements of each component based on the replacement date due to service life and the replacement date due to failure as the replacement timing of each component. More specifically, the number-of-replacement counter 127 executes a process P601 that obtains the replacement date due to service life for each component of each of the work machines 10 calculated by the replacement time predictor 126 and a process P602 that obtains the replacement date due to failure for each component of each of the work machines 10. Furthermore, the number-of-replacement counter 127 refers to, for example, the user information database 115, and executes a process P603 that totalizes the numbers of replacements of each component for each of the distributors 40 in charge of each of the work machines 10. The totalization of each component is possible for various unit totalization periods corresponding to the replacement date due to service life and the replacement date due to failure of each component, such as daily, weekly, or monthly.

FIG. 9 is a table illustrating an exemplary totalization result of the number-of-replacement counter 127. The number-of-replacement counter 127 totalizes the numbers of replacements of components for a month for each of the models and unit numbers of the work machines 10, names of the distributors 40, part names, and part numbers as shown in, for example, the upper table in FIG. 9. The number-of-replacement counter 127 totalizes the numbers of replacements of components for a month for each of names of the distributors 40, part names, and part numbers as shown in, for example, the lower table in FIG. 9.

The manufacturer 30, each distributor 40, and the component supplier 50 of the work machine 10 can access the maintenance management DB server 110 of the maintenance management center 20 or the maintenance management control device 120, for example, using the terminals 31, 41, and 51 as shown in FIG. 1, so as to refer to the table shown in FIG. 9. This allows the manufacturer 30, the distributors 40, and the component supplier 50 to know the number of orders for the components in the future in advance.

Figure 10:
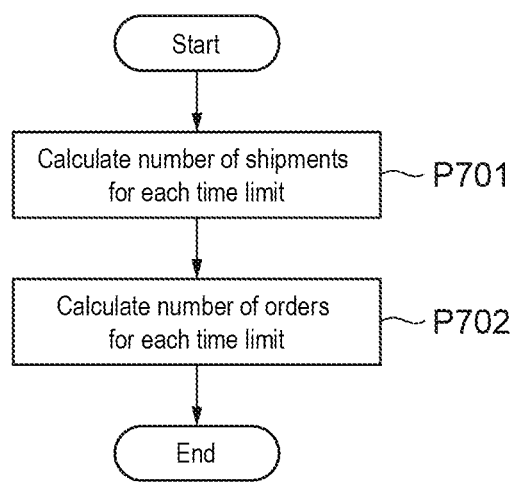
FIG. 10 is a flowchart illustrating a process flow of an order timing predictor of the maintenance management control device in FIG. 2.

FIG. 10 is a flowchart illustrating a process flow of the order timing predictor 128 of the maintenance management control device 120 in FIG. 2. The order timing predictor 128 predicts an order timing of a component based on the number of replacements for each component and a lead time for each component. The order timing predictor 128 executes a process P701 that, first, refers to the machine database 112 and the user information database 115, and calculates the number of shipments of each component for each time limit from the manufacturer 30 to each of the distributors 40, based on a supply route of each component from the manufacturer 30 to each of the distributors 40.

FIG. 11 is a table for describing a process 701 by the order timing predictor 128 in FIG. 10. The top table in FIG. 11 indicates one example of shipment time limits and the numbers of shipments of the components to be shipped from a regional base of the manufacturer 30 to the distributors 40. The second table from the top in FIG. 11 indicates one example of the shipment time limits and the numbers of shipments of the components to be shipped from the manufacturer 30 to each of the regional bases of the manufacturer 30 and the distributors 40. The third table from the top in FIG. 11 indicates one example of the shipment time limits and the numbers of shipments of the components to be shipped from the manufacturer 30 to the regional bases of the manufacturer 30 and the distributors 40. The bottom table in FIG. 11 indicates one example of order time limits and the numbers of orders of the components to be ordered from the manufacturer 30 to the component supplier 50.

In the example shown in FIG. 11, a component 1 is supplied to an agency a as one distributor 40 from the manufacturer 30 via a regional base, and is directly supplied to an agency b as another distributor 40 from the manufacturer 30 without via a regional base. The lead time necessary for transportation of the component 1 from the manufacturer 30 to the regional base is, for example, three months, and the lead time necessary for transportation of the component 1 from this regional base to the agency a is, for example, one month. The lead time necessary for the transportation from the manufacturer 30 to the agency h is, for example, two months. The lead time necessary for production of the component 1 in the component supplier 50 and transportation of the component 1 from the component supplier 50 to the manufacturer 30 is, for example, four months.

In this case, in the above-described process P701, the order timing predictor 128, first, refers to the number of replacements of the component in each month for each of the names of the distributors 40, the part names, and the part numbers totalized by the number-of-replacement counter 127, as indicated in the lower table in FIG. 9. Then, the order timing predictor 128 shifts the number of the components 1 to be supplied to the agency a as the distributor 40 via the regional base of the manufacturer 30 forward by one month, which is the lead time necessary for transportation of the component 1 from this regional base to the agency a. This allows calculating the shipment time limit and the number of shipments to the agency a as the distributor 40 from the regional base of the manufacturer 30 as indicated in the top table in FIG. 11.

Furthermore, the order timing predictor 128 shifts the shipment time limit and the number of shipments from the regional base of the manufacturer 30 to the agency a as the distributor 40 as indicated in the top table in FIG. 11 forward by three months, which are the lead time necessary for transportation of the component 1 from the manufacturer 30 to the regional base. This allows calculating the shipment time limit and the number of shipments from the manufacturer 30 to the regional base of the manufacturer 30 as indicated in the second table from the top in FIG. 11.

Furthermore, the order timing predictor 128 shifts the number of replacements of the components in each month of the agency b as the distributor 40 indicated in the lower table in FIG. 9, in which the components 1 are directly shipped from the manufacturer 30, forward by two months, which are the lead time necessary for the transportation of the component 1 from the manufacturer 30 to the agency b. This allows calculating the shipment time limit and the number of shipments from the manufacturer 30 to the agency b as the distributor 40 as indicated in the second table from the top in FIG. 11.

Furthermore, the order timing predictor 128 aggregates the number of shipments to the regional base and the number of shipments to the agency b as the distributor 40 from the manufacturer 30 indicated in the second table from the top in FIG. 11 for each of the shipment time limits. This allows calculating the shipment time limits and the total numbers of shipments from the manufacturer 30 to the regional base of the manufacturer 30 and the distributor 40 as indicated in the third table from the top in FIG. 11.

Next, the order timing predictor 128 executes a process P702 that calculates the number of orders for each time limit to the component supplier 50. The order timing predictor 128 shifts the shipment time limits and the total numbers of shipments from the manufacturer 30 to the regional base and the distributor 40 indicated in the third table from the top in FIG. 11 forward by four month, which are the lead time necessary for production of the components 1 in the component supplier 50 and transportation of the components 1 from the component supplier 50 to the manufacturer 30. This allows calculating the order time limits and the total numbers of orders of the component 1 from the manufacturer 30 to the component supplier 50 indicated in the bottom table in FIG. 11. Then, the process shown in FIG. 10 is terminated.

The manufacturer 30, each distributor 40, and the component supplier 50 of the work machine 10 can access the maintenance management DB server 110 of the maintenance management center 20 or the maintenance management control device 120, for example, using the terminals 31, 41, and 51 as shown in FIG. 1, so as to refer to the table shown in FIG. 11. This allows the manufacturer 30, the distributors 40, and the component supplier 50 to know the number of orders for the components in the future in advance.

Figure 12:
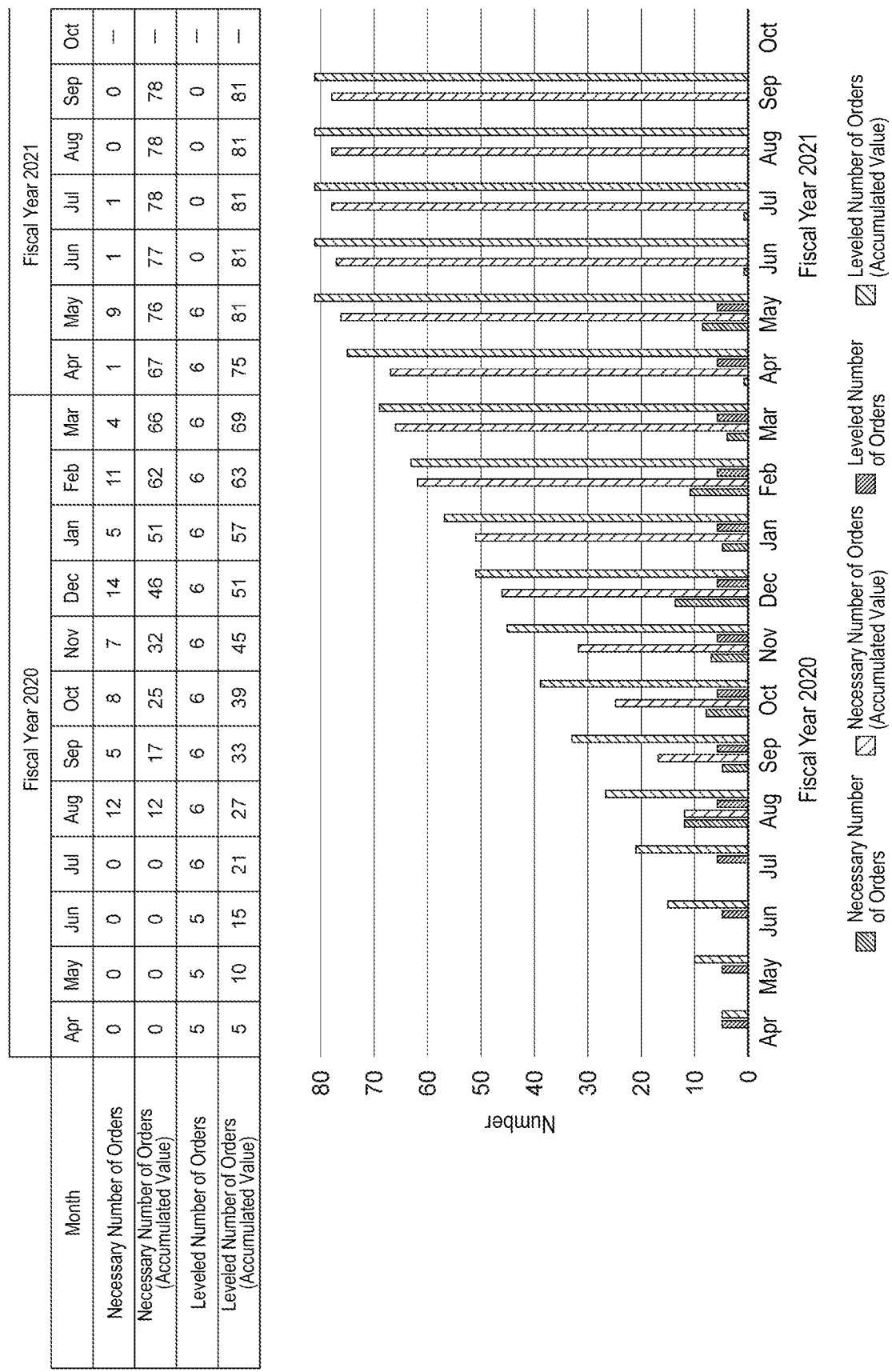
FIG. 12 is a table and a graph for describing a process by an order-leveling unit of the maintenance management control device in FIG. 2.

Finally, a description will be given of an operation of the order-leveling unit 129 of the maintenance management control device 120 in FIG. 2 with reference to FIG. 12. FIG. 12 is a table and a graph for describing a process by the order-leveling unit 129 of the maintenance management control device 120 in FIG. 2. The order-leveling unit 129 calculates, for example, a leveled number of orders and a leveled order timing that do not exceed a suppliable number in its manufacturing period of each component based on the number of replacements and the suppliable number of each component.

The number of orders to the component supplier 50 needs to be leveled so as not to exceed the suppliable number in the manufacturing period of the components by the component supplier 50 to deliver the necessary number of the components from the component supplier 50 to the manufacturer 30 by the shipment time limit of the components to the distributor 40 or the like. For example, the component supplier 50 has a capacity of the suppliable number of the component 1 in the manufacturing period of 10. In this case, the order-leveling unit 129 calculates, for example, an accumulated value of the necessary numbers of orders for each order time limit based on the necessary number of orders and the order time limit of the component 1 from the manufacturer 30 to the component supplier 50 as indicated in the upper table in FIG. 12.

Furthermore, the order-leveling unit 129 calculates, for example, the leveled number of orders of 10 or less, which does not exceed the suppliable number of the component 1 in the manufacturing period of the component supplier 50 as indicated in the upper table in FIG. 12. At this time, the order-leveling unit 129 calculates, for example, the leveled number of orders for all the order time limits such that the accumulated value of the order-leveling unit 129 for each order time limit becomes equal to or more than an accumulated value of the necessary numbers of orders. This avoids the order for the components 1 exceeding the capacity of the suppliable number of the component supplier 50 to allow the stable supply of the component 1. The order-leveling unit 129 may consider the inventory quantity of the components 1 in the component supplier 50.

As described above, the work machine maintenance management system 100 of the embodiment includes the maintenance management DB server 110, which accumulates the maintenance management information of the plurality of work machines 10, and the maintenance management control device 120, which predicts the replacement timings of each component of each of the work machines 10 based on the maintenance management information. The above-described maintenance management information accumulated in the maintenance management DB server 110 includes the actual durable period from start of use to replacement for each component of each of the work machines 10. The maintenance management control device 120 includes the replacement-factor determining section 121, the service life model creator 122, the failure model creator 123, and the replacement time predictor 126. The replacement-factor determining section 121 determines whether the replacement factor of each component is the service life factor or the failure factor based on the actual durable period of each component of the plurality of work machines 10. The service life model creator 122 creates the service life model of the component whose replacement factor is determined to be the service life factor by the replacement-factor determining section 121. The failure model creator 123 creates the failure model of the component whose replacement factor is determined to be the failure factor by the replacement-factor determining section 121. The replacement time predictor 126 predicts the replacement timing of each component of each of the work machines 10 based on the service life model and the failure model.

This configuration allows the work machine maintenance management system 100 of the embodiment to predict the replacement timing of the component of the work machine 10 early. More specifically, the maintenance management DB server 110 accumulates the maintenance management information including the actual durable period of each component of each of the work machines 10, and the replacement-factor determining section 121 of the maintenance management control device 120 can determine the replacement factor based on the actual durable period for each component of each of the work machines 10. Furthermore, the maintenance management control device 120 can create the service life model for each component with the service life model creator 122 and can create the failure model for each component with the failure model creator 123, based on the replacement factor. Furthermore, the maintenance management control device 120 can predict the replacement timing for each component of each of the work machines 10 by considering the service life and the failure using the replacement time predictor 126, based on the created service life model and failure model. Accordingly, this embodiment provides the work machine maintenance management system 100 capable of predicting the replacement timing of the components of the work machine 10 early.

In the maintenance management system 100 of the embodiment, the above-described maintenance management information accumulated in the maintenance management DB server 110 includes, for example, the lead time from order to delivery for each component of each of the work machines 10. The maintenance management control device 120 includes the number-of-replacement counter 127, which totalizes the numbers of replacements of each component based on the replacement timing of each component, and the order timing predictor 128, which predicts the order timing of the component based on the number of replacements of each component and the lead time of each component. This configuration allows the maintenance management system 100 of the embodiment to predict the order timing considering the lead time of each component and to order the component earlier for delivery. Accordingly, in the working sites that employ the work machine 10, this makes it possible to deliver the component before replacement of the component of the work machine 10, thus minimizing the shutdown period of the work machine 10.

In the maintenance management system 100 of the embodiment, the above-described maintenance management information accumulated in the maintenance management DB server 110 includes the suppliable number of each component in the manufacturing period. The maintenance management control device 120 includes the order-leveling unit 129, which calculates the leveled number of orders and the leveled order timing that do not exceed the suppliable number in the manufacturing period for each component based on the number of replacements and the suppliable number for the component. This configuration allows the maintenance management system 100 of the embodiment to avoid the order for components that exceeds the suppliable number of the component supplier 50 and to stably supply the components.

In the maintenance management system 100 of the embodiment, the above-described maintenance management information accumulated in the maintenance management DB server 110 includes the operating information of each of the work machines 10. The service life model creator 122 creates the service life model using the multiple regression analysis taking the operating information of the work machine 10 including the component whose replacement factor is the service life factor as the explanatory variable and taking the actual durable period of the component whose replacement factor is the service life factor as the objective variable. This configuration allows the maintenance management system 100 of the embodiment to further precisely predict the service life of each component of each of the work machines 10 based on the operating information of each of the work machines 10.

In the maintenance management system 100 of the embodiment, the above-described maintenance management information accumulated in the maintenance management DB server 110 includes the attribute information and the operating information of each of the work machines 10. The failure model creator 123 creates one or more group of the work machines 10 including the component whose replacement factor is the failure factor based on the attribute information of the work machine 10 and creates the failure model for each of the groups based on the operating information of the work machines 10 included in each of the groups. This configuration allows creating, for example, the failure model for each group including the work machines 10 having the similar operating information to precisely predict the failure for each component of each of the work machines 10.

In the maintenance management system 100 of the embodiment, the above-described maintenance management information accumulated in the maintenance management DB server 110 includes the market information related to each of the work machines 10. The maintenance management control device 120 includes the operation model creator 124, which creates the operation model based on the operating information and the market information of each of the work machines 10, and the operating information complementing unit 125, which creates complementing information based on the operation model when the operating information has a missing portion. This configuration allows inputting the operating time transition in future of the work machines 10 based on the operation model in the failure model, so as to enable the precise prediction of the failure of the component.

In the maintenance management system 100 of the embodiment, the operation model creator 124 creates the operation model for each group. The operating information complementing unit 125 creates the complementing information based on the operation model of each group when the operating information has a missing portion. This configuration allows inputting the total operating time in future based on the operation model of each group in the failure model, so as to enable the further precise prediction of the failure of the component.

As described above, while the embodiment of the work machine maintenance management system according to the present disclosure has been described in detail using the drawings, the specific configuration is not limited to this embodiment. Design changes and the like within a scope not departing from the gist of the present disclosure are included in the present disclosure.

REFERENCE SIGNS LIST

1 Component
10 Work machine
100 Work machine maintenance management system
110 Maintenance management database server
120 Maintenance management control device
121 Replacement-factor determining section
122 Service life model creator
123 Failure model creator
124 Operation model creator
125 Operating information complementing unit
126 Replacement time predictor
127 Number-of-replacement counter
128 Order timing predictor
129 Order-leveling unit

The invention claimed is:

1. A work machine maintenance management system comprising:
a maintenance management database server that accumulates maintenance management information of a plurality of work machines; and
a maintenance management control device that predicts a replacement timing of each component of each of the plurality of work machines based on the maintenance management information,
wherein the maintenance management information includes an actual durable period from start of use to replacement of each of the components of each of the plurality of work machines,
wherein the maintenance management control device includes a replacement-factor determining section, a service life model creator, a failure model creator, and a replacement time predictor,
wherein the replacement-factor determining section determines whether a replacement factor of each of the components is a service life factor or a failure factor based on the actual durable period of each of the components of a plurality of the work machines,
wherein the service life model creator creates a service life model of the component whose replacement factor is determined to be the service life factor by the replacement-factor determining section,
wherein the failure model creator creates a failure model of the component whose replacement factor is determined to be the failure factor by the replacement-factor determining section, and
wherein the replacement time predictor predicts a replacement timing of each of the components of each of the plurality of work machines based on the service life model and the failure model.

2. The work machine maintenance management system according to claim 1,
wherein the maintenance management information include a lead time from order to delivery for each of the components, and
wherein the maintenance management control device includes a number-of-replacement counter that totalizes a number of replacements of each of the components based on the replacement timing of each of the components and an order timing predictor that predicts an order timing of the component based on the number of replacement of each of the components and the lead time of each of the components.

3. The work machine maintenance management system according to claim 2,
wherein the maintenance management information includes a suppliable number in a manufacturing period of each of the components, and
wherein the maintenance management control device includes an order-leveling unit that calculates a leveled number of orders and a leveled order timing that do not exceed the suppliable number in the manufacturing period for each of the components based on the number of replacements of each of the components and the suppliable number.

4. The work machine maintenance management system according to claim 1,
wherein the maintenance management information includes operating information of each of the work machines, and
wherein the service life model creator creates the service life model using a multiple regression analysis taking the operating information of the work machine including the component whose replacement factor is the service life factor as an explanatory variable and taking the actual durable period of the component whose replacement factor is the service life factor as an objective variable.

5. The work machine maintenance management system according to claim 1,
wherein the maintenance management information includes attribute information and operating information of each of the work machines, and
wherein the failure model creator creates one or more groups of the work machines including the component whose replacement factor is the failure factor based on the attribute information and creates the failure model for each of the groups based on the operating information of a plurality of the work machines included in each of the groups.

6. The work machine maintenance management system according to claim 5,
   wherein the maintenance management information includes market information related to each of the work machines, and
   wherein the maintenance management control device includes an operation model creator that creates an operation model based on the operating information and the market information of each of the work machines and an operating information complementing unit that creates complementing information based on the operation model when the operating information has a missing portion.

7. The work machine maintenance management system according to claim 6,
   wherein the operation model creator creates the operation model for each of the groups, and
   wherein the operating information complementing unit creates the complementing information based on the operation model of each of the groups when the operating information has a missing portion.

* * * * *